United States Patent [19]
Demers

[11] 3,819,304
[45] June 25, 1974

[54] OIL METERING PUMP
[75] Inventor: Theodore E. Demers, Ann Arbor, Mich.
[73] Assignee: General Motors Corporation, Detroit, Mich.
[22] Filed: Apr. 26, 1973
[21] Appl. No.: 354,701

[52] U.S. Cl.................. 417/375, 184/29, 417/343, 418/84, 418/88
[51] Int. Cl........................................... F16n 13/16
[58] Field of Search........ 184/29, 39; 417/338, 343, 417/375, 405; 418/83, 84, 88; 123/196 R

[56] References Cited
UNITED STATES PATENTS
3,764,234   10/1973   Morgan et al. .................... 123/8.01

Primary Examiner—Carlton R. Croyle
Assistant Examiner—Michael Koczo, Jr.
Attorney, Agent, or Firm—Ronald L. Phillips

[57] ABSTRACT

An oil metering pump metering oil to lubricate gas seals in a rotary engine has a rotor member that is driven by the engine and carries a fuel plunger which is reciprocated by fuel flow to the engine during rotor rotation and operates through a lever to reciprocate an oil plunger to meter oil for gas seal lubrication in proportion to the amount of fuel being used.

3 Claims, 4 Drawing Figures

OIL METERING PUMP

In gasoline engines that require lubricating oil supply into the working chambers, such as certain rotary and two-cycle reciprocating piston engines, it is known to provide a pump that meters oil for such lubrication at a rate that increases with engine load as determined by engine speed and throttle opening. It is also known to deliver this metered oil to the working chambers by first delivering the oil to the float bowl of the carburetor, such being the case in current rotary engine automobiles. Instead of metering, it is also known to premix the oil with the gasoline in a certain proportion in certain non-automotive applications such as in small two-stroke engines for lawn mowers, boats and the like. However, this precise method of oil supply in proportion to gasoline usage for efficient seal lubrication is not practical for automotive use.

An object of the present invention is to provide a new and improved oil metering pump for delivering lubricant to an engine in proportion to fuel usage.

Another object is to provide an oil metering pump that uses fuel flow to an engine to effect metered oil flow for engine lubrication in proportion to the fuel flow.

Another object is to provide an oil metering pump that meters oil to lubricate gas seals in an engine by means of an engine driven rotor that carries a fuel plunger that is reciprocated by fuel flow during rotor rotation and operates through a lever to reciprocate an oil plunger that effects oil displacement in proportion to the fuel flow.

These and other objects of the present invention will become more apparent with reference to the following description and drawing in which:

FIG. 1 is an elevational view with parts in section of a rotary engine having an oil metering pump according to the present invention.

Figure 2:
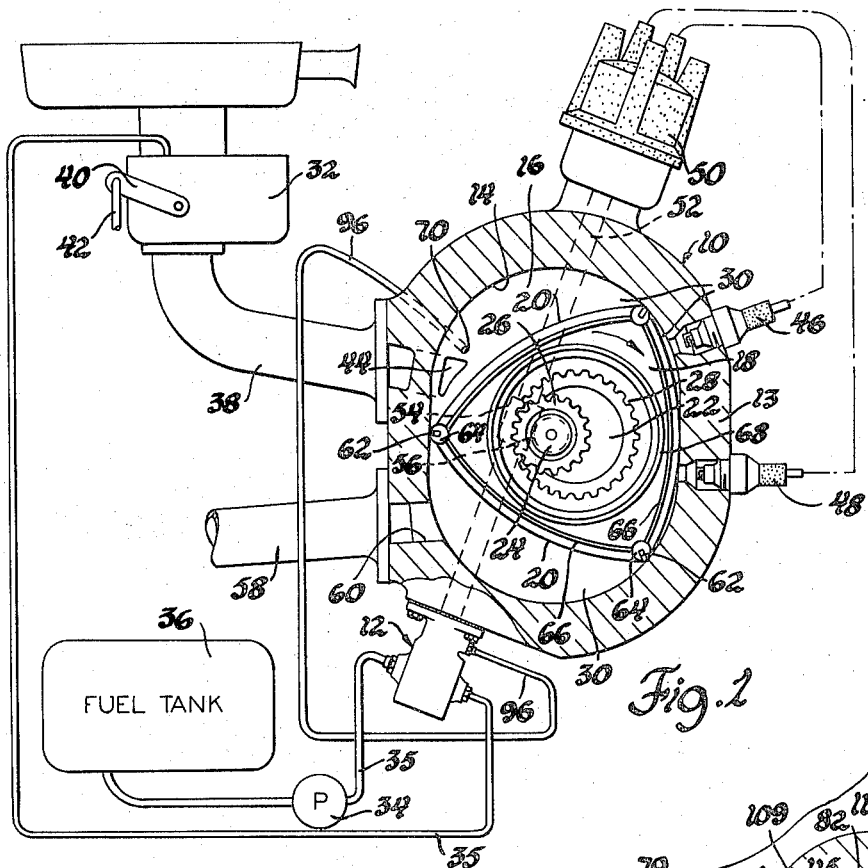
FIG. 2 is an enlarged longitudinal sectional view of the oil metering pump in FIG. 1.

Referring to FIG. 1, there is shown a rotary combustion engine 10 having an oil metering pump 12 according to the present invention that meters oil to lubricate the engine's gas seals. The engine 10 comprises a stationary outer body or housing 13 having a rotor cavity that is defined by an inwardly facing peripheral wall 14 and a pair of opposed side walls 16, only one of which is shown. The peripheral wall 14 is in the shape of a two-lobed epitrochoid or a curve parallel thereto and a rotor 18 having the general shape of a triangle with three convex peripheral faces 20 is mounted within the rotor cavity on an eccentric 22 of a crankshaft 24 which is rotatably mounted outboard of the rotor cavity in the side walls 16. An annular externally toothed gear 26 is received about and concentric with the crankshaft 24 and is rigidly secured to the engine housing 13. The gear 26 meshes with an internally toothed gear 28 that is concentric with and fixed to one side of the rotor 118. The gear 28 has one and one-half times the number of teeth as the gear 26 with the result that this gearing enforces a fixed cyclic relation between the rotor and the crankshaft such that the crankshaft which is the engine's output shaft makes three complete revolutions for every one complete revolution of the rotor. The rotor faces 20 cooperate with the peripheral wall 14 and with the side walls 16 to define three variable volume working chambers 30 that are spaced around and move with the rotor within the housing as the rotor orbits within the rotor cavity.

A carburetor 32 supplied with gasoline fuel by a pump 34 via a fuel line 35 from a fuel tank 36 delivers an air-fuel mixture to an intake manifold 38 under the control of the carburetor's throttle valve whose opening is controlled by a throttle lever 40 that is pivotally connected to a rod 42 that is linked to an accelerator pedal, not shown, for control by the vehicle operator. The intake manifold 38 is connected in the engine housing 13 to deliver the air-fuel mixture to opposed intake ports 44, only one of which is shown, in the side walls 16. On rotor rotation in the direction indicated by the arrow in FIG. 1, air-fuel mixture is sequentially periodically admitted to the chambers 30 by the traversing motion of the rotor relative to the intake ports 44 whereafter the air-fuel mixture is trapped and then compressed in readiness for ignition. Sequential ignition of the air-fuel mixture in the chambers 30 is effected by two spark plugs 46 and 48 which receive timed ignition pulses from a distributor 50 whose shaft 52 is driven by the crankshaft 24, this drive being effected by a pinion 54 which is secured to a mid-portion of the distributor shaft 52 and meshes with a worm gear 56 formed or fixed on the crankshaft 24. The electrodes of the two spark plugs 46 and 48 are open to the chambers 30 through the peripheral wall 14 and are peripherally spaced thereabout so that the plug 46 is said to trail the other plug 48. The spark plugs 46 and 48 may be fired together or only one fired according to certain engine operating conditions as is well known in the art. With combustion, the peripheral wall 14 takes the reaction to force the rotor 18 to continue rotating and eventually each working chamber following the expansion phase is exhausted to an exhaust manifold 58 via an exhaust port 60 that is open to the rotor cavity through the peripheral wall 14 and is periodically traversed by the rotor apexes.

Sealing of the chambers 30 is effected by apex seals 62 each of which extends the width of the rotor and is mounted at a rotor apex, corner seals each of which is mounted in a rotor side at each rotor apex, and side seals 66 each of which is mounted in a rotor side and extends between pairs of corner seals with the corner seals each providing a sealing link between the adjacent ends of two side seals and one apex seal. The apex seals 62 are urged radially outward by spring means, not shown, to continuously engage the peripheral wall 14 and both the corner seals 64 and side seals 66 on both rotor sides are urged axially outward by suitable spring means, not shown, to continuously engage the side walls 16. In addition, there is provided a circular oil seal 68 mounted in a concentric groove in each rotor side that is biased axially outward by suitable spring means, not shown, to continuously engage the opposite side wall 16 to prevent oil that is used for lubrication of the crankshaft and other rotating parts from moving radially outward to the gas seals.

The oil metering pump 12 according to the present invention is suited to metering oil for delivery to the rotary engine of the above type via a gas seal lubrication system like that described in copending U. S. application Ser. No. 271,785, entitled "Rotary Engine Gas Seal Lubrication System", filed July 14, 1972 by James M. Casey. In this type of gas seal lubrication system the metered oil is supplied to a pair of oil feed ports 70, only one of which is shown, that are located in the side walls 16. The oil feed ports 70 are located opposite each other at the same radial and angular locations relative to the crankshaft axis and close to and past the side wall intake ports 44 in the direction of rotor rotation so that they are traversed or wiped by the respective rotor side seals during rotor motion the same as the side wall intake ports 44. With this arrangement the side wall oil feed ports 70 feed oil onto the side walls as the side seals sequentially wipe past after having wiped past the side wall intake ports. Most of the oil thus delivered is wiped across the side walls and the remainder is thrown by centrifugal force to lubricate the peripheral wall. For further details of such a gas seal lubrication system reference should be made to the aforementioned Casey patent application.

Describing now the structure of the oil metering pump 12 according to the present invention, there is as shown in FIG. 2 a pump body 72 which has an annular projection 74 on its upper end received in an annular groove 76 in the underside of the engine housing 13 to locate the pump body in proper relationship with an aperture 78 through the engine housing to an oil drain region, the pump body 72 being secured in place by three bolts 79 with a gasket 80 between the pump body and engine housing being provided to prevent leakage. The pump body 72 has a stepped diameter bore 81 extending therethrough in which is mounted a correspondingly stepped diameter pump rotor 82. The small diameter portion 83 of the pump rotor 82 extends into engine housing aperture 78 and has a tongue 84 formed at its upper end which is received in a slot 85 in the lower end of the distributor shaft 52 whereby the pump rotor 82 is driven at a speed proportional to engine speed. The large diameter portion 86 of the pump rotor 82 limits upward movement relative to the pump body by its engagement with shoulder 88 of the pump body bore 81 while downward movement and also closure of the lower end of the bore is provided by a cap 89. Cap 89 is retained in place by a retainer ring 90 and has an O-ring 91 positioned in an annular groove which engages the large diameter portion of the pump body bore 81 to prevent leakage from the lower end thereof.

Supply of lubricating oil to the pump to lubricate the gas seals is provided by engine lubricating oil which is drained from the bottom of the engine housing 13 via a drilled passage 92 that registers on mounting of the pump with a drilled inlet passage 93 through the interface of the pump body 72. The inlet passage 93 meets with an oil inlet port 94 which opens to the small diameter portion of the pump body bore 81. An oil outlet port 95 is provided in the pump body 72 for delivering oil from the pump to an oil feed line 96 which is secured by a fitting 97 to the pump body and is connected at the other end to the engine housing 13 to deliver oil to the oil feed ports 70 in the side walls 16. The oil outlet port 94 opens to the small diameter portion of the pump body bore 81 diametrically opposite the location of the inlet port 95 and these ports may be drilled in a single operation. The pump body 72 also has a fuel inlet port 98 which is open to the large diameter portion of the pump body bore 81 and is connected by a fitting 99 in the fuel line 35. The pump body 72 further has a fuel outlet port 100 which also opens to the large diameter portion of the pump body bore 81 at a location diametrically opposite that of the fuel inlet port 98 and thus these ports may also be drilled in a single operation. The fuel outlet port 100 is connected by a fitting 101 to the fuel line 35 whereby fuel must enter the fuel inlet port 98 and exit through the fuel outlet port 100 before reaching the carburetor 32.

Figure 3:
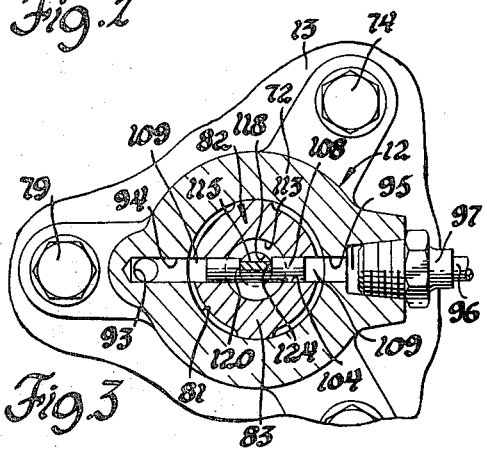
FIG. 3 is a view of the oil metering pump taken along the line 3—3 in FIG. 2.
Figure 2:
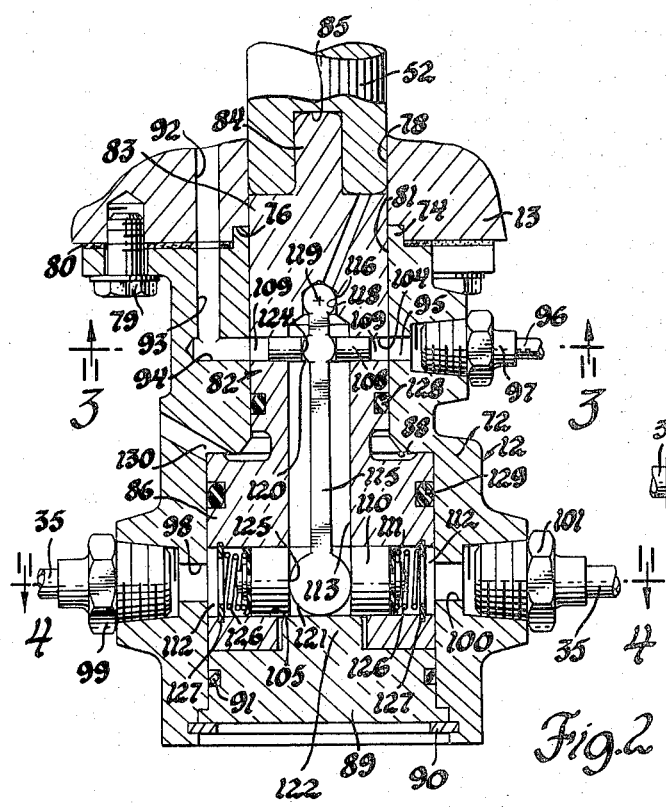
Figure 4:
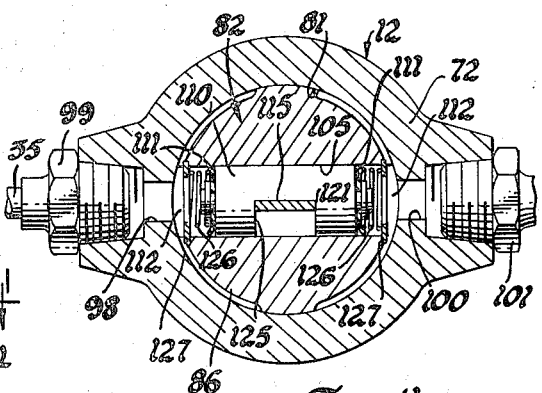
FIG. 4 is a view of the oil metering pump taken along the line 4—4 in FIG. 2.

Metering of oil to the oil feed line 96 in proportion to fuel flow is effected in the oil metering pump by an oil cylinder 104 and a fuel cylinder 105 which extend radially through the small and large diameter portions 83 and 86, respectively, of the pump rotor 82 and are axially spaced to align with the oil inlet and outlet ports 94 and 95 and fuel inlet and outlet ports 98 and 100, respectively, and are also circumferentially extending porting so as to remain in communication therewith for limited intervals during pump rotor rotation as shown in FIGS. 2, 3 and 4. Recognizing that the fuel flow is considerably greater than the oil flow, the fuel cylinder 105 is of larger cross-section or diameter and longer length to provide for larger fuel displacement than oil displacement. As shown in FIGS. 2 and 3, a cylindrical double ended oil plunger 108 is mounted for reciprocal movement in the oil cylinder 104 and cooperates therewith and also with the small diameter portion of the pump body bore 81 to provide variable volume oil chambers 109 at opposite ends of the oil plunger that alternately, periodically and simultaneously open to the oil inlet and outlet ports 94 and 95 during pump rotor rotation. Similarly, a cylindrical double ended fuel plunger 110 having disc shaped seals 111 secured to the ends thereof is mounted for reciprocal movement in the fuel cylinder 105 and cooperates therewith and also with the large diameter portion of the pump body bore 81 to provide variable volume fuel chambers 112 at opposite ends of the fuel plunger that are thus larger than the oil chambers 109 and alternately, periodically and simultaneously open to the fuel inlet and outlet ports 98 and 100 in phase with the openings of the oil chambers 109 to the oil inlet and outlet ports 94 and 95 as the pump rotor turns as shown in FIGS. 2 and 4.

The oil plunger 108 and fuel plunger 110 are mechanically linked so that reciprocation of the fuel plunger 110 effects reciprocation of the oil plunger 108. This is effected by the provision of an axially extending central opening 113 in pump rotor 82 which is drilled from the lower end thereof and intersects with the fuel and oil cylinders 105 and 104. A lever 115 of rectangular cross-section is located in the pump rotor's central opening 113 and at its upper end has a rounded portion 116 which is closely fitted in a reduced diameter portion 118 at the closed end of the opening 113 whereby the lever is pivotal about a fulcrum 119 on the pump rotor axis. In addition, the lever 115 has rounded portions 120 and 121 which closely fit in transverse slots 124 and 125 in the oil and fuel plungers 108 and 110, respectively, and there is provided a boss 122 on the interior side of cap 89 that engages the lower rounded end of lever 115 to maintain the lever's axial position. With the lever 115 thus engaging these plungers at spaced locations therealong and the fuel plunger location farthest from the fulcrum 119, when the fuel plunger 110 is reciprocated the lever 115 is caused to pivot about its fulcrum 119 and reciprocate the oil plunger 108 in phase with the fuel plunger but with less stroke whereby with each turn of the pump rotor one of the fuel chambers 112 expands and opens to the fuel inlet port 98 and one of the oil chambers 109 expands and opens to the oil inlet port 94 while the other fuel chamber contracts and opens to the oil outlet port 95. A centering bias for the lever 115 for neutral operation, i.e. the rotor is turning but the plungers do not reciprocate, is assured by light coil springs 126 which are located in the fuel chambers 112 against ring seats 127 mounted near the outboard ends of cylinder 105 and act on the opposite ends of fuel plunger 110 to bias the lever to the position shown where it is centered on the pump rotor axis. To prevent internal leakage in the pump there are provided O-rings 128 and 129 between the oil and fuel ports which are received in annular grooves in the small and large diameter portions 83 and 86 of the pump rotor, respectively, these O-rings engaging the pump body bore 81 and there being provided a vent passage 130 to atmosphere through the pump body 72 to vent the bore between these seals.

Describing now the oil metering operation provided by pump 12, when the engine 10 is running and thus pump rotor 82 is turning but there is no fuel flowing to the carburetor 32, the pressure at the fuel inlet and outlet ports 98 and 100 will be equal and whereby as the pump rotor rotates there will be no pressure differential acting to reciprocate the fuel plunger 110 and thus the lever 115 remains in neutral and there will be effected no corresponding reciprocation of the oil plunger 108. However, when the valve in the float bowl of the carburetor opens to provide for more fuel supply the pressure at the fuel outlet port 100 will drop resulting in a pressure differential across the fuel plunger 110 which forces its movement to expand the fuel chamber 112 then open to the fuel inlet port 98 while contracting the other fuel chamber which is then open to the fuel outlet port 100 to displace fuel in the direction of the carburetor. This fuel plunger movement or stroke through operation of lever 115 causes the oil plunger 108 to also stroke and expand the oil chamber 109 then open to the oil inlet port 94 while contracting the other oil chamber which is then open to the oil outlet port 95 to displace oil in the direction of the oil feed line 96. Then as the fuel plunger 110 approaches the end of its stroke and the oil plunger 108 is correspondingly approaching the end of its stroke, the pump rotor will have revolved one-half turn causing the fuel chamber previously open to the inlet port to now be open to the fuel outlet port whereupon the fuel pressure differential on the fuel plunger 110 is now in the opposite direction to cause the fuel plunger to thus stroke in the opposite direction and thus effect stroking of the oil plunger in the opposite direction whereby the fuel and oil chambers that were discharged are recharged with fuel and oil, respectively, while the other fuel and oil chambers now contract to displace their charges in the proper direction of flow. Then when the fuel flow demand has ceased, the pressure differential across the fuel plunger 110 will return to zero resulting in no fuel plunger reciprocation and thus no oil plunger reciprocation and therefore no oil displacement. Thus, the oil flow for lubrication is provided by this metering arrangement at a rate directly proportional to the fuel flow. It will also be apparent that while this metering arrangement is disclosed in use in a rotary engine, it is also suited for use in other type engines including two-stroke reciprocating piston engines having similar lubrication supply requirements.

The above described embodiment is illustrative of the invention which may be modified within the scope of the appended claims.

I claim:

1. An oil metering pump for an engine having an output shaft, a pressurized supply of fuel, gas seals and a supply of lubricating oil for said gas seals, said pump comprising a pump body having a bore, a pump rotor mounted in said bore to rotate about a rotor axis, means drivingly connecting said output shaft to rotate said pump rotor, said pump body having an oil inlet port open to said bore for receiving said oil from said oil supply and an oil outlet port open to said bore for delivering this oil to lubricate said gas seals, said pump body also having a fuel inlet port open to said bore for receiving said fuel from said fuel supply and a fuel outlet port open to said bore for delivering this fuel to said engine, said pump rotor having an oil cylinder and a fuel cylinder, an oil plunger mounted for reciprocating movement in said oil cylinder and cooperating therewith and with said bore to provide variable volume oil chambers at opposite ends of said oil plunger that alternately, periodically and simultaneously open to said oil inlet and outlet ports during pump rotor rotation, a fuel plunger mounted for reciprocating movement in said fuel cylinder and cooperating therewith and with said bore to provide variable volume fuel chambers at opposite ends of said fuel plunger that alternately, periodically and simultaneously open to said fuel inlet and outlet ports in phase with the openings of said oil chambers to said oil inlet and outlet ports, a lever pivotally mounted on said pump rotor and engaging both said oil plunger and fuel plunger at locations spaced along said lever so that when said fuel plunger is reciprocated said lever causes said oil plunger to reciprocate in phase therewith whereby during each turn of said pump rotor one of said fuel chambers opens to said fuel inlet port and one of said oil chambers opens to said oil inlet port while the other fuel chamber opens to said fuel outlet port and the other oil chamber opens to said oil outlet port whereupon fuel enters from said fuel inlet port into the one fuel chamber and causes said fuel plunger to contract the other fuel chamber to force the fuel therein to said fuel outlet port for delivery to said engine while said fuel plunger acting on said lever causes said oil plunger to move to expand the one oil chamber then open to said oil inlet port to draw oil therefrom into the one oil chamber and contract the other oil chamber then open to said oil outlet port to force the oil therein to said oil outlet port for delivery to said gas seals whereby oil is metered for gas seal lubrication at a rate which increases with increasing fuel flow to said engine.

2. An oil metering pump for an engine having an output shaft, a pressurized supply of fuel, gas seals and a supply of lubricating oil for said gas seals, said pump comprising a pump body having a bore, a pump rotor mounted in said bore to rotate about a rotor axis, means drivingly connecting said output shaft to rotate said pump rotor, said pump body having an oil inlet port open to said bore for receiving said oil from said oil supply and an oil outlet port open to said bore for delivering this oil to lubricate said gas seals, said pump body also having a fuel inlet port open to said bore for receiving said fuel from said fuel supply and a fuel outlet port open to said bore for delivering this fuel to said engine, said pump rotor having an oil cylinder and a fuel cylinder extending radially therethrough which are axially spaced to align with said oil inlet and outlet ports and said fuel inlet and outlet ports respectively during pump rotor rotation, an oil plunger mounted for reciprocating movement in said oil cylinder and cooperating therewith and with said bore to provide variable volume oil chambers at opposite ends of said oil plunger that alternately, periodically and simultaneously open to said oil inlet and outlet ports during pump rotor rotation, a fuel plunger mounted for reciprocating movement in said fuel cylinder and cooperating therewith and with said bore to provide variable volume fuel chambers at opposite ends of said fuel plunger that alternately, periodically and simultaneously open to said fuel inlet and outlet ports in phase with the openings of said oil chambers to said oil inlet and outlet ports, said pump rotor having an opening intersecting with said oil and fuel cylinders, a lever pivotally mounted in said opening on said pump rotor to pivot about a fulcrum on said pump rotor axis and engaging both said oil plunger and fuel plunger at locations spaced along said lever so that when said fuel plunger is reciprocated said lever causes said oil plunger to reciprocate in phase therewith whereby during each turn of said pump rotor one of said fuel chambers opens to said fuel inlet port and one of said oil chambers opens to said oil inlet port while the other fuel chamber opens to said fuel outlet port and the other oil chamber opens to said oil outlet port whereupon fuel enters from said fuel inlet port into the one fuel chamber and causes said fuel plunger to contract the other fuel chamber to force the fuel therein to said fuel outlet port for delivery to said engine while said fuel plunger acting on said lever causes said oil plunger to move to expand the one oil chamber then open to said oil inlet port to draw oil therefrom into the one oil chamber and contract the other oil chamber then open to said oil outlet port to force the oil therein to said oil outlet port for delivery to said gas seals whereby oil is metered for gas seal lubrication at a rate which increases with increasing fuel flow to said engine.

3. An oil metering pump for an engine having an output shaft, a pressurized supply of fuel, gas seals and a supply of lubricating oil for said gas seals, said pump comprising a pump body having a bore, a pump rotor mounted in said bore to rotate about a rotor axis, means drivingly connecting said output shaft to rotate said pump rotor, said pump body having an oil inlet port for receiving said oil from said oil supply and an oil outlet port for delivering this oil to lubricate said gas seals, said pump body also having a fuel inlet port for receiving said fuel from said fuel supply and a fuel outlet port for delivering this fuel to said engine, said oil inlet and outlet ports opening to said bore at diametrically opposite locations, said fuel inlet and fuel outlet ports open to said bore at diametrically opposite locations that are axially spaced from and at the same angular locations as said oil inlet and outlet ports respectively, said pump rotor having an oil cylinder and a larger cross-section fuel cylinder extending radially therethrough which are axially spaced to align with said oil inlet and outlet ports and said fuel inlet and outlet ports respectively during pump rotor rotation, an oil plunger mounted for reciprocating movement in said oil cylinder and cooperating therewith and with said bore to provide variable volume oil chambers at opposite ends of said oil plunger that alternately, periodically and simultaneously open to said oil inlet and outlet ports during pump rotor rotation, a fuel plunger mounted for reciprocating movement in said fuel cylinder and cooperating therewith and with said bore to provide variable volume fuel chambers at opposite ends of said fuel plunger that are larger than said oil chambers and alternately, periodically and simultaneously open to said fuel inlet and outlet ports in phase with the openings of said oil chambers to said oil inlet and outlet ports, said pump rotor having an axially extending central opening intersecting with said oil and fuel cylinders, a lever pivotally mounted in said opening on said pump rotor to pivot about a fulcrum on said pump rotor axis and engaging both said oil plunger and fuel plunger at locations spaced along said lever with said fuel plunger location farthest from said fulcrum so that when said fuel plunger is reciprocated said lever causes said oil plunger to reciprocate in phase therewith but with less stroke whereby during each turn of said pump rotor one of said fuel chambers opens to said fuel inlet port and one of said oil chambers opens to said oil inlet port while the other fuel chamber opens to said fuel outlet port and the other oil chamber opens to said oil outlet port whereupon fuel enters from said fuel inlet port into the one fuel chamber and causes said fuel plunger to contract the other fuel chamber to force the fuel therein to said fuel outlet port for delivery to said engine while said fuel plunger acting on said lever causes said oil plunger to move in the same radial direction to expand the one oil chamber then open to said oil inlet port to draw oil therefrom into the one oil chamber and contract the other oil chamber then open to said oil outlet port to force the oil therein to said oil outlet port for delivery to said gas seals whereby oil is metered for gas seal lubrication at a rate which increases with increasing fuel flow to said engine and is less than the fuel rate.

* * * * *